OTHO E. HORNIDY, OF CHAUNCY, ILLINOIS.

Letters Patent No. 89,314, dated April 27, 1869.

IMPROVED MEDICINE FOR CATTLE AND OTHER ANIMALS.

The Schedule referred to in these Letters Patent and making part of the same.

*To all whom it may concern:*

Be it known that I, OTHO E. HORNIDY, of Chauncy, in the county of Lawrence, and State of Illinois, have invented a new and improved Medical Compound, for the purpose of preventing and curing the diseases known and prevailing as hog-cholera, chicken-cholera, and cattle-plague; and I do hereby declare that the following is a full and exact description thereof.

The nature of my invention consists in the compounding of the following ingredients:

Carbonate of iron, *Ferri ferrocyanuret,* chlorate of potash, sulphur, one pound each; indigo, sulphate zinc, arsenic, four ounces each.

The whole to be well powdered or ground before mixing, then mix and triturate well.

Now I' claim that one ingredient is not incompatible with the other, and that in the compound are remedial agents to meet the indication of each disease separately, both as a preventive and a cure; and I further aver that I have, by *post-mortem* examinations, ascertained that there is a similarity existing between the disease; hence my combination.

I further believe that said diseases are a poison, and that my medical compound is an antidote for the same.

Its action on cattle-plague is such, that when taken into the stomach, it neutralizes the poison. It is taken up by the absorbents, and carried through the system by the circulation and nervous forces, neutralizing the poison, and vitalizing the whole system in its course; hence gives nature a chance to recuperate.

Its action on hog-cholera is such, that when taken into the stomach, it vitalizes the organs of digestion, acts as an antacid, equalizes the circulation, opens up the pores of the skin, gives tone to the whole organic system; hence produces a thorough reaction.

Its action upon chicken-cholera is much the same.

Dose for cattle is one tablespoonful dissolved in warm water, and drench, or if they will eat, one teaspoonful, mixed with salt, to each animal once per day.

Dose for preventive is one tablespoonful once per week, in salt.

Dose for hogs is one to two teaspoonfuls dissolved in warm water, and drench, or if they will eat, the same to be given in slop once per day.

For a preventive, one tablespoonful twice per week, in food.

Dose for chickens: one teaspoonful to a pint of corn-meal dough, mixed with alum-water; feed all they will eat.

What I claim as my invention, is—

The above new and improved medical compound, the same being for the use of preventing and curing the above-mentioned diseases.

Witnesses:    OTHO E. HORNIDY.
B. P. MUNNS,
SILAS WAGGONER.